US012155972B2

(12) United States Patent
Chaurasia et al.

(10) Patent No.: US 12,155,972 B2
(45) Date of Patent: Nov. 26, 2024

(54) METHOD AND SYSTEM FOR RESOLVING FAULTS IN A SECURITY CAMERA

(71) Applicant: Honeywell International Inc., Charlotte, NC (US)

(72) Inventors: Jitendra S. Chaurasia, Bengaluru (IN); Mourian Balasubramanian, Bangalore (IN); Amit Kumar Grewal, Bhiwani (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 113 days.

(21) Appl. No.: 17/881,553

(22) Filed: Aug. 4, 2022

(65) Prior Publication Data
US 2024/0048670 A1 Feb. 8, 2024

(51) Int. Cl.
*H04N 7/18* (2006.01)
*H04N 17/00* (2006.01)
*H04N 23/65* (2023.01)
*H04N 23/661* (2023.01)

(52) U.S. Cl.
CPC .......... *H04N 7/183* (2013.01); *H04N 17/002* (2013.01); *H04N 23/65* (2023.01); *H04N 23/661* (2023.01)

(58) Field of Classification Search
CPC ...... H04N 7/183; H04N 17/002; H04N 23/65; H04N 23/661
USPC ...................................................... 348/207.99
See application file for complete search history.

(56) References Cited

U.S. PATENT DOCUMENTS

| 8,538,401 | B2 | 9/2013 | Kim et al. |
| 10,523,319 | B2 | 12/2019 | Afgani |
| 10,715,889 | B2 | 7/2020 | Berner |
| 10,736,201 | B2 | 8/2020 | Burchardt et al. |
| 10,855,369 | B2 | 12/2020 | Ritchie |
| 11,063,665 | B2 | 7/2021 | Walker |
| 11,169,612 | B2 | 11/2021 | Trim et al. |

(Continued)

FOREIGN PATENT DOCUMENTS

EP 1768411 A1 3/2007

OTHER PUBLICATIONS

Ahmed, "Javascript Self Invoking Functions," 8 pages, Jan. 26, 2012. Accessed Jul. 1, 2022.

(Continued)

*Primary Examiner* — Lin Ye
*Assistant Examiner* — Chan T Nguyen
(74) *Attorney, Agent, or Firm* — Seager, Tufte & Wickhem, LLP (57) ABSTRACT

Methods and systems for resolving one or more faults in a security camera include installing an Auto-Executable Function (AEF) on the security camera. The AEF causes the controller to backup the set of user defined configuration settings to a memory of the security camera, reset the security camera back to the set of default configuration settings, reboot the security camera, and restore the set of user defined configuration settings. In many cases, this will resolve many unresolved faults within video camera and place the video camera back online. When this does not resolve a fault, the AEF creates a diagnostic report, wirelessly transmits the diagnostic report to a mobile device of a user, the mobile device identifies a software patch for resolving the fault, and the software patch is uploaded and installed on the security camera.

19 Claims, 6 Drawing Sheets

(56) References Cited

U.S. PATENT DOCUMENTS

| | | |
|---|---|---|
| 11,190,275 B2 | 11/2021 | Afgani |
| 11,239,915 B2 | 2/2022 | Burchardt et al. |
| 11,283,520 B2 | 3/2022 | Tsonev et al. |
| 11,387,900 B2 | 7/2022 | Afgani |
| 11,768,672 B1 * | 9/2023 | Silakov ................. G06F 11/302 |
| | | 717/172 |
| 2002/0154243 A1 | 10/2002 | Fife et al. |
| 2008/0024666 A1 * | 1/2008 | Sudo ................. H04N 21/4858 |
| | | 348/565 |
| 2009/0195655 A1 | 8/2009 | Pandey |
| 2017/0251365 A1 | 8/2017 | Burchardt et al. |
| 2018/0144296 A1 * | 5/2018 | Engel ..................... H04N 7/183 |
| 2018/0302158 A1 | 10/2018 | Norval |
| 2019/0028192 A1 | 1/2019 | Tsonev et al. |
| 2020/0168014 A1 | 5/2020 | Uliyar et al. |
| 2020/0366372 A1 | 11/2020 | Tsonev et al. |
| 2021/0072968 A1 * | 3/2021 | Mezaael ..................... G06F 8/65 |
| 2021/0184776 A1 | 6/2021 | Vazzana et al. |
| 2021/0194584 A1 | 6/2021 | Rossius |
| 2021/0194592 A1 | 6/2021 | Schaeffer |
| 2021/0224060 A1 * | 7/2021 | Mukundala ............. G06F 8/654 |
| 2021/0321347 A1 | 10/2021 | Ghoraishi et al. |
| 2021/0344419 A1 | 11/2021 | Berner et al. |
| 2021/0405601 A1 * | 12/2021 | Hultqvist ................ G06F 21/57 |
| 2022/0030156 A1 | 1/2022 | Spanos |
| 2022/0045761 A1 | 2/2022 | Csajaghy et al. |
| 2022/0147042 A1 * | 5/2022 | Trank ...................... H04L 65/80 |
| 2022/0166506 A1 | 5/2022 | Carraro et al. |
| 2022/0224414 A1 | 7/2022 | Haas et al. |
| 2022/0261933 A1 * | 8/2022 | Prugh ................... H04W 4/021 |

OTHER PUBLICATIONS

"Camera doesn't Work in Windows," Microsoft, 7 pages, Accessed Mar. 15, 2022.

Quora, "What are the Common Ways a Virus Program Executes itself for the very First Time to Infect a Host System,?" 6 pages, Accessed Aug. 4, 2022.

PALADIN Security, "11 Security Camera Troubleshooting Tips," 20 pages, 2022, Accessed Mar. 15, 2022.

Swann, "Smart Security Camera SAFE by Swann App Manual," 55 pages, 2018.

Wikipedia, "Diagnostic Program," 3 pages, Accessed Aug. 4, 2022.

Extended European Search Report, European Patent Office, EP Application No. 23188506.2, Dec. 22, 2023 (8 pages).

* cited by examiner

METHOD AND SYSTEM FOR RESOLVING FAULTS IN A SECURITY CAMERA

TECHNICAL FIELD

The present disclosure relates generally to a video surveillance system that includes a plurality of video cameras. More particularly, the present disclosure relates to methods and systems for detecting and resolving faults within video cameras of a video surveillance system.

BACKGROUND

Known surveillance systems often include a large number of video cameras that are used to provide video surveillance across a site. The performance of a video camera may degrade over time or go offline for a variety of reasons. For a video camera that is mounted outdoors, it may be impacted by weather, such as wind, rain, and snow. In some cases, a video camera may be negatively impacted by either too much light or not enough light in the vicinity of the video camera. In some cases, hardware and/or software failures may occur. These are just a few examples of how the performance of a video camera may become compromised. In systems that include tens, hundreds, or even thousands of video cameras, maintaining the video surveillance system can be time consuming, tedious and expensive. In some cases, an operator may receive an alert indicating that a particular video camera is no longer connected. In response, a truck roll is often initiated by the operator to dispatch a technician to troubleshoot and resolve the issue with the video camera. Meanwhile, the video camera remains offline and not available to the surveillance system. Not only are truck rolls expensive, they can take significant time, resulting in diminished capability of the surveillance system. What would be desirable are improved methods and systems for resolving faults in a security camera of a surveillance system.

SUMMARY

The present disclosure relates generally to a video surveillance system that includes a plurality of video cameras. More particularly, the present disclosure relates to methods and systems for detecting and resolving faults within video cameras of a video surveillance system. In an example of the present disclosure, a security camera may include a memory. The memory may store firmware for the security camera, a set of default configuration settings for the security camera, a set of user defined configuration settings for the security camera, and an auto-executable function (AEF). In some cases, the memory may be a non-volatile memory. A controller may be operatively coupled to the memory. The controller may be configured to auto-execute the auto-executable function (AEF). The auto-executable function (AEF) may cause the controller to backup the set of user defined configuration settings to the memory, reset the security camera back to the set of default configuration settings, reboot the security camera, and restore the set of user defined configuration settings. In many cases, this will resolve unresolved faults within video camera and place the video camera back online.

In another example of the present disclosure, a method of resolving one or more faults in a security camera may include executing an auto-executable function (AEF) on the security camera. The auto-executable function (AEF) may detect a fault in the security camera, create a diagnostic report that includes the fault, wirelessly transmit the diagnostic report to a mobile device of a user, identify a software patch for resolving the fault, upload the software patch from the mobile device to the security camera, and install the software patch on the security camera. In some cases, the AEF may be initially uploaded to the security camera from the mobile device, after which the AEF is auto-executed by the security camera.

In another example of the present disclosure, a method of resolving one or more faults in a security camera may include auto-executing an auto-executable function (AEF) on the security camera. The auto-executable function (AEF) may detect a fault on the security camera, perform a backup of a set of user defined configuration settings for the security camera, reset the security camera back to a set of default configuration settings, reboot the security camera, and restore the set of user defined configuration settings.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise.

The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
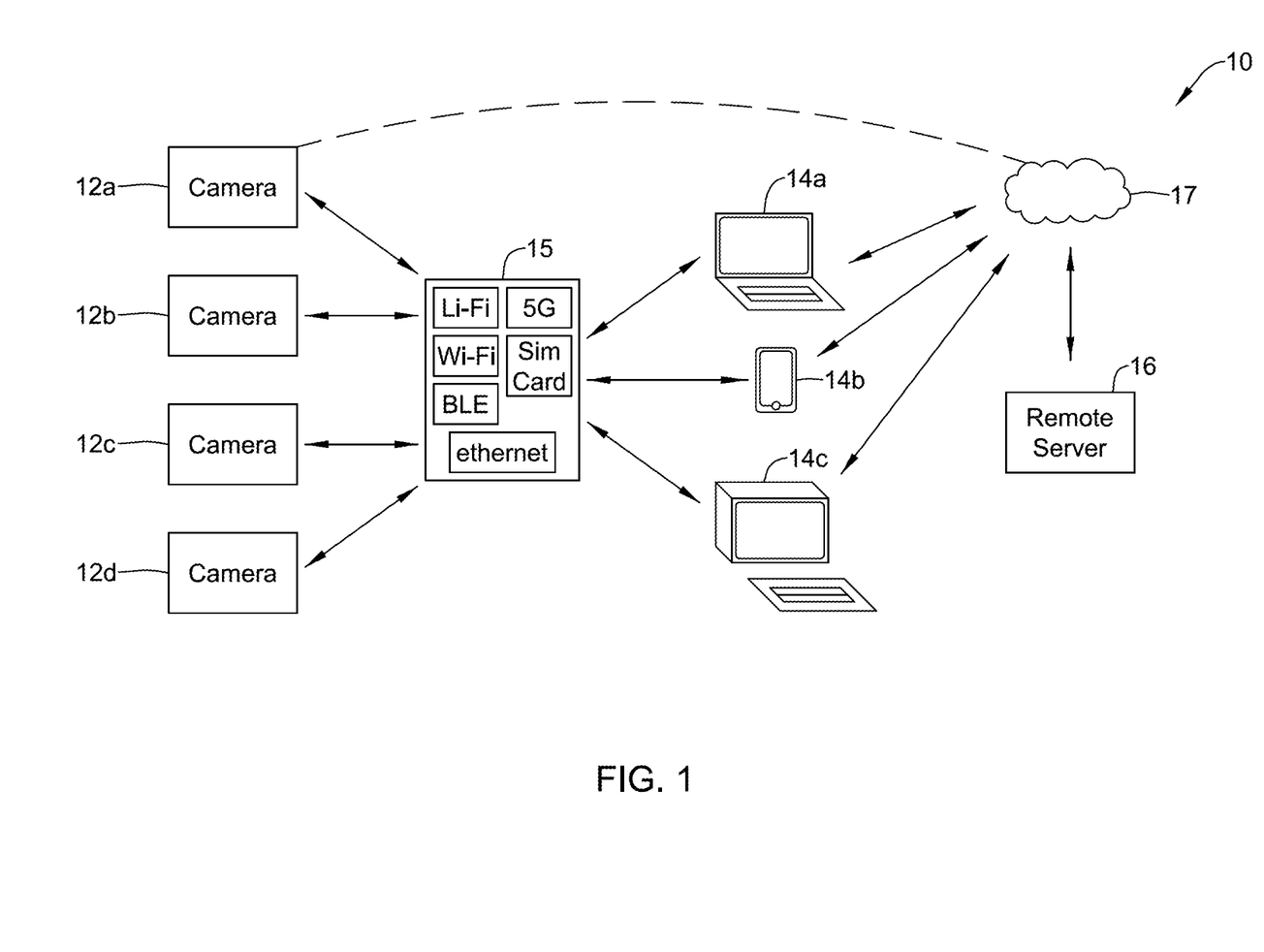
FIG. 1 is a schematic block diagram of an illustrative video surveillance system.

The present disclosure relates generally to a video surveillance system that includes a plurality of security cameras. FIG. 1 is a schematic block diagram of an illustrative surveillance system 10 that includes a plurality of security cameras 12a, 12b, 12c, and 12d. The plurality of security cameras 12a, 12b, 12c, 12d may generally be referred to herein as cameras 12. While a total of four cameras 12 are shown, it will be appreciated that this is merely illustrative, as the video surveillance system 10 may include any number of cameras 12. For example, the video surveillance system 10 may include tens, hundreds, or even thousands of cameras 12. The cameras 12 may be video cameras that each provide a video stream, and in some cases, at least some of the cameras 12 may be still cameras that capture still images, perhaps on a particular schedule or in response to detected motion. In some cases, one or more the cameras 12 may be Pan/Tilt/Zoom cameras.

In some cases, an image or video stream captured by each of the cameras may be transmitted to a remote server 16 over one or more networks. In some cases, the one or more networks may include a wide area network or global network (WAN) including, for example, the Internet. In some cases, the cameras 12 may communicate with the remote server 16 through a cloud 17, as indicated by the dashed line. In some cases, the remote server 16 may provide live video streams to a workstation (not explicitly shown), and may store or archive some or all of the video streams for later review.

In some cases, the cameras 12 may communicate over one or more networks with a laptop 14a, a smart phone 14b, or a desktop computer 14c, using any desired wired or wireless communication protocol. The laptop 14a, the application on the smart phone 14b, and the desktop computer 14c, may each be generally referred to herein as a mobile device 14. In some cases, the cameras 12 may include a wireless communication port for communicating with a mobile device (e.g. a laptop 14a, a smart phone 14b, or a desktop computer 14c). The communication port may support one or more wireless communication protocols such as cellular communication, ZigBee, REDLINK™, Bluetooth, WiFi, 5G, LiFi, a SIM card, dedicated short range communication (DSRC), EnOcean, and/or any other suitable common or proprietary wireless protocol, as desired. In some cases, the communication port may support one or more wired communication protocols, such as TCIP, RS-232 and/or any suitable common or proprietary wired protocol, as desired.

In some cases, the mobile device 14 may communicate with the remote server 16, sometimes via the cloud 17. The mobile device 14 may communicate with the remote server 16 using any suitable communication protocol. While it is illustrated that the mobile device 14 may be the laptop 14a, the application on the smart phone 14b, and/or the desktop computer 14c, it is contemplated that the mobile device 14 may include another device such as a tablet, e-reader, key fob, or the like.

Figure 2:
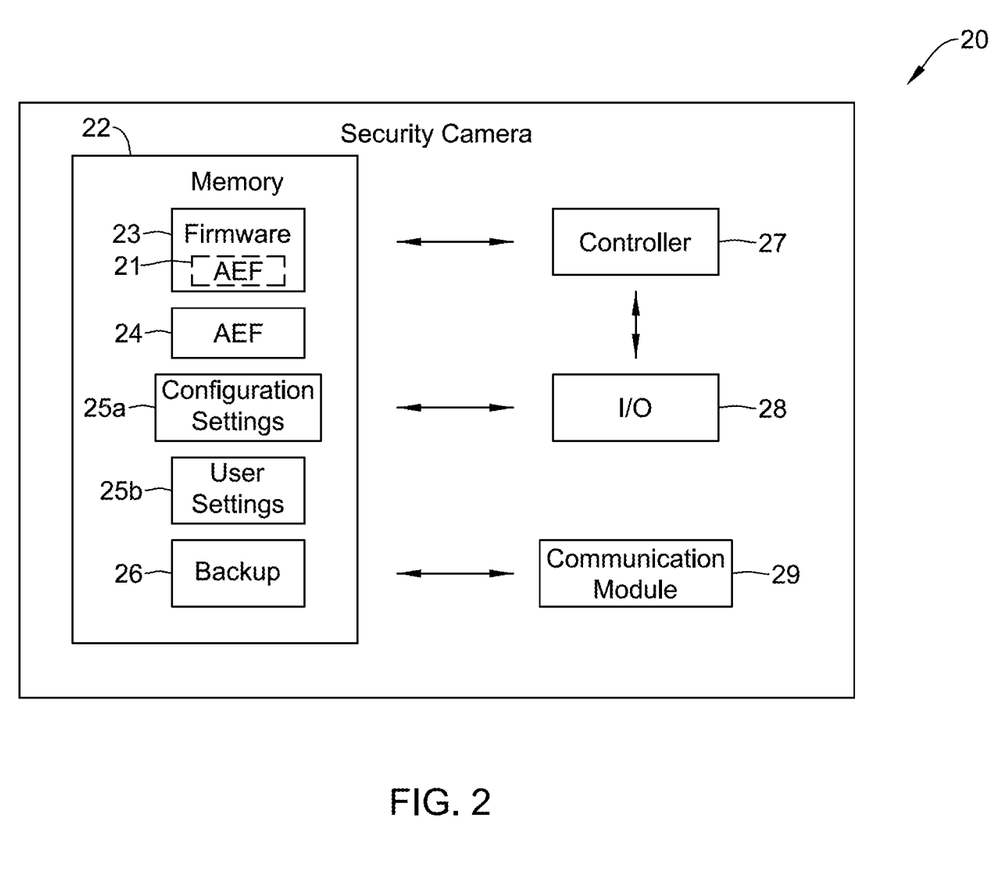
FIG. 2 is a schematic block diagram of a security camera of the illustrative video surveillance system of FIG. 1.

FIG. 2 is a schematic block diagram of a security camera 20 of the illustrative video surveillance system 10 of FIG. 1. The security camera 20 may be considered as an example of the cameras 12 of FIG. 1. As shown in FIG. 2, the illustrative security camera 20 also includes a controller 27 that is operatively coupled to a memory 22. The memory 22 may be any suitable type of storage device including, but not limited to, RAM, ROM, EPROM, flash memory, a hard drive and/or the like. In some cases, the memory 22 may be a non-volatile memory which may be configured to store, for example, firmware 23 for the security camera 20, a set of default configuration settings 25a for the security camera 20, a set of user defined configuration settings 25b for the security camera 20, and an auto-executable function (AEF) 24 for the security camera 20. In some cases, an AEF may be distinct from the firmware 23, as indicated by AEF 24. In some cases, the firmware 23 may include an AEF 21, as indicated by the dashed lines. In some cases, the AEF 24 is uploaded to the memory 22 from a mobile device 14 (see FIG. 1), and then auto-executed by the controller 27 of the security camera 20. In some cases, the AEF 24 is pre-loaded into the memory 22 by the manufacturer of the security camera 20.

In some cases, the security camera 20 may include a communication module 29. The communication module 29 may be configured to establish a communication link with a mobile device (e.g., mobile device 14) of a user. In some cases, communication module 29 is configured to receive the AEF 24 from the mobile device and store the AEF 24 within the memory 22 of the security camera 20 for auto-execution by the controller 27 of the security camera 20. In some cases, the communication module 29 may be configured to establish a communication link with the mobile device (e.g., mobile device 14) even when the controller 27 of the security camera 20 is non-responsive. For example, and in some cases, the communication module 29 may include a separate operating system instance that can boot and run independently of controller 27 of the security camera. In some cases, the communication module 29 may be configured to send results of one or more diagnostic tests performed by the AEF 24 to the mobile device, sometimes even when the controller 27 of the security camera 20 is non-responsive. The communication module 29 may be configured to receive one or more software patches from the mobile device and cause the one or more software patches to be installed on the security camera 20.

The security camera 20 may include one or more inputs, indicated by I/O block 28, for communicating with a remote device such as the remote server 16 (sometimes via the cloud 17). The I/O block 28 may, for example, receiving commands or other instructions from the remote server 16. The controller 27 may execute the receive commands or other instructions. The I/O block 28 may also provide raw or processed images to a remote device such as the remote server 16 and/or a remote Video Recorder Device. In some cases, the I/O block 28 may provide a diagnostic report to the remote server 16. In some instances, the I/O block 28 and the communication module 29 may be considered a single block.

The controller 27 may be configured to auto-execute the AEF 24. In some cases, the controller 27 may be configured to auto-execute the AEF 24 in response to one or more of a boot of the security camera 20, a detected fault in the security camera 20, an establishment of a communication link between the security camera 20 and a mobile device, an upload of the AEF 24 to the security camera 20 from a remote device such as a mobile device 14 and/or the remote server 16, and/or in response to any suitable triggering event.

The AEF 24 may be configured to backup the set of user defined configuration settings 25b to the memory 22, as indicated by backup block 26. The AEF 24 may be configured to reset the security camera 20 back to the set of default configuration settings 25a, reboot the security camera 20, and restore the set of user defined configuration settings 25b. In some cases, the AEF 24 may further cause the controller 27 to update the firmware 23 stored in the memory 22 prior to rebooting the security camera 20.

In some cases, the AEF 24 may be uploaded to the security camera 20 via a mobile device (e.g., mobile device 14) via one of a wired or a wireless connection, such as, for example, Ethernet, Li-Fi, Wi-Fi, Bluetooth, cellular (e.g. 5G, 4G). In some cases, the AEF 24 may be configured to cause the controller 27 to perform diagnostic tests on the security camera 20 and record the results. Upon performing the diagnostic tests on the security camera 20, the AEF 24 may create a diagnostic report that includes the fault and relevant diagnostic data. In some cases, the diagnostic report may include, for example, one or more of a current status of each of one or more components of the security camera, a measure of a response time for each of one or more components of the security camera, a measure of a utilization rate for each of one or more components of the security camera, a set of current configuration settings for the security camera, a software version for each of one or more software components currently running on the security camera, and a hardware identifier for each of one or more components of the security camera. In some cases, the one or more components of the security camera may include hardware components such as a camera, a lens, a housing, mounts, and/or wiring.

An illustrative use case may include an operator of a surveillance security system receiving an alert that one of a plurality of security cameras is suspected of having a fault. The user may take a mobile device (e.g., mobile device 14) and travel to (e.g., walk, drive, etc.) the site of the faulty security camera. When the mobile device is within a desirable distance of the faulty security camera, the user ensures that the security camera is connected to and is receiving power. Once power is confirmed for the security camera, an application on the mobile device may auto-connect the mobile device to the security camera via LiFi, WiFi, 5G, Bluetooth, a SIM card, or the like. The application on the mobile device will then prompt an upload of an auto-executable function (AEF) to the security camera. The AEF, once uploaded, will auto-execute. The AEF may automatically check various parameters and components of the security camera for faults, perform a backup of the current settings of the security camera, check, upload and update the firmware of the security camera as necessary, check, upload and install software patches to the security camera as necessary, reboot the security camera, and restore the backed up settings of the security camera. In many cases, this will resolve many unresolved faults within video camera and place the video camera back online. If the fault within the security camera is not resolved, the application on the mobile device will connect to a remote diagnostic server (e.g. remote server 16), download diagnostic data retrieved from the security camera to the remote server and perform a search to find an appropriate software patch, if any, and then upload an appropriate software patch to the security camera. In some cases, the fault may still not be resolved. In such cases, the application on the mobile device may submit a diagnostic report to a service provider for the development of a new software patch. The service provider may then create the new patch and push the new software patch through the application on the mobile device to the security camera. These are just examples.

Figure 3:
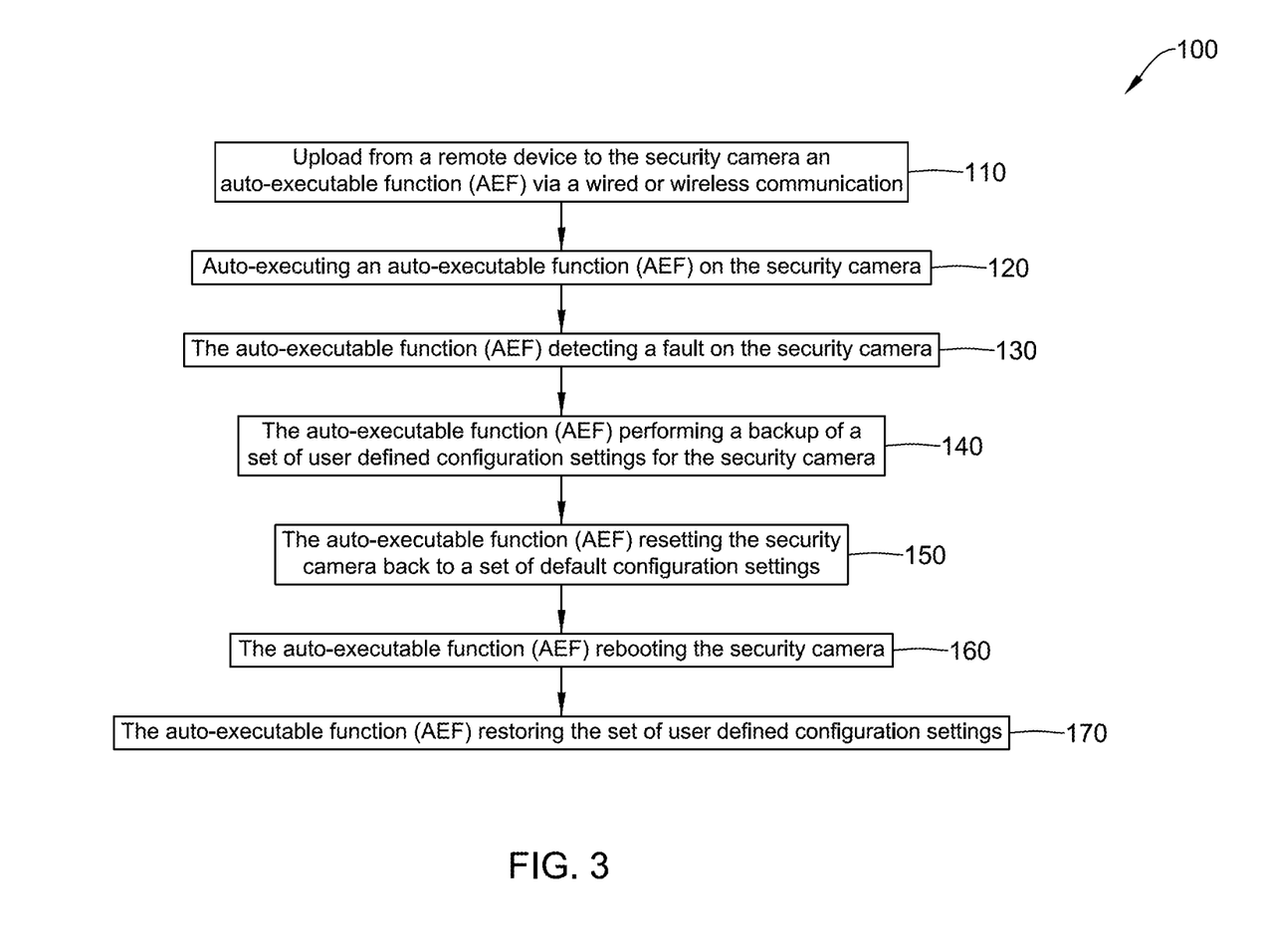
FIG. 3 is a flow diagram showing an illustrative method that may be carried out via the illustrative video surveillance system of FIG. 1.

FIG. 3 is a flow diagram showing an illustrative method 100 of resolving one or more faults in a security camera (e.g., security camera 20) that may be carried out via the illustrative video surveillance system 10 of FIG. 1. The illustrative method 100 includes uploading from a remote device to the security camera an auto-executable function (AEF) via a wired or wireless communication, as referenced by block 110. The remote device may be a mobile device such as a mobile phone, a tablet computer, a laptop computer, a personal computer, a server, or any other suitable remote device. In some cases, the wired or wireless communication link may include, for example, an ethernet link, a LiFi link, a WiFi link, a Bluetooth link, a 5G link, a SIM card link, and/or any other suitable communication link. In some cases, the AEF may be pre-loaded into the security camera by the manufacturer of the security camera, such as pre-loaded in the firmware of the security camera. The method 100 further includes auto-executing an auto-executable (AEF) on the security camera, as referenced by block 120. The AEF may detect a fault on the security system, as referenced by block 130, and in response the AEF may perform a backup of a set of user defined configuration settings for the security camera, as referenced by block 140. The AEF may then reset the security camera back to a set of default configuration settings, as referenced by block 150, and reboot the security camera, as referenced by block 160. The AEF may then restore the set of user defined configuration settings, as referenced by block 170. In many cases, this will resolve unresolved faults within video camera and place the video camera back online.

Figure 4:
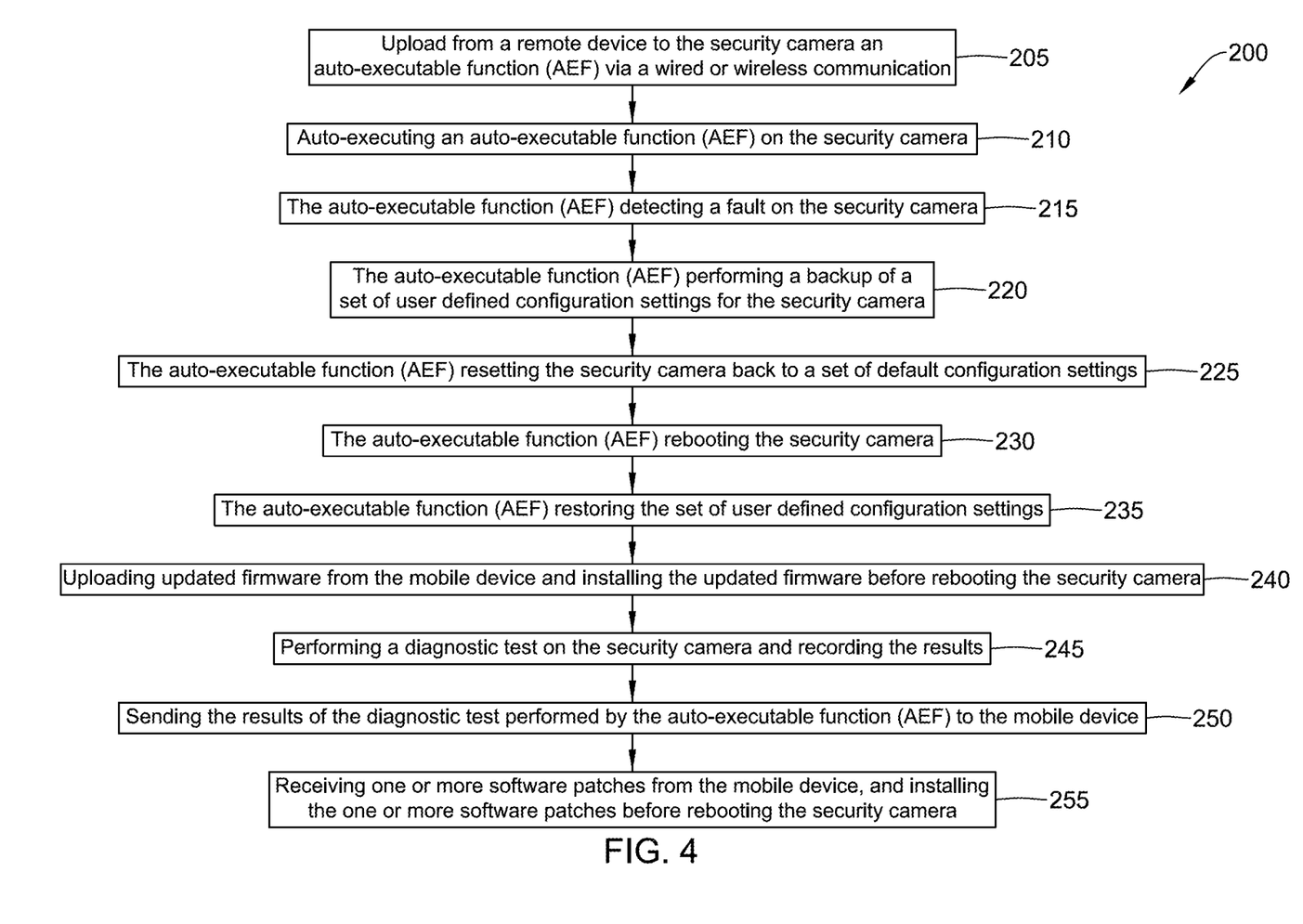
FIG. 4 is a flow diagram showing an illustrative method that may be carried out via the illustrative video surveillance system of FIG. 1.

FIG. 4 is a flow diagram showing an illustrative method 200 of resolving one or more faults in a security camera (e.g., security camera 20) that may be carried out via the illustrative video surveillance system 10 of FIG. 1. The illustrative method 200 includes uploading from a remote device to the security camera an auto-executable function (AEF) via a wired or wireless communication, as referenced by block 205. The remote device may be a mobile device such as a mobile phone, a tablet computer, a laptop computer, a personal computer, a server, or any other suitable remote device. In some cases, the wired or wireless communication link may include, for example, an ethernet link, a LiFi link, a WiFi link, a Bluetooth link, a 5G link, a SIM card link, and/or any other suitable communication link. In some cases, the AEF may be pre-loaded into the security camera by the manufacturer of the security camera, such as pre-loaded in the firmware of the security camera. The method 200 further includes auto-executing an auto-executable (AEF) on the security camera, as referenced by block 210. In some cases, the AEF may be auto-executed on the security camera in response to one or more of a reboot of the security camera, a detected fault in the security camera, an establishment of a communication link between the security camera and a mobile device, an upload of the AEF to the security camera from a remote device such as a mobile device and/or the remote server, and/or in response to any suitable triggering event. The AEF may detect a fault in the security camera, as referenced by block 215. In some cases, the AEF may be used to establish a wireless communication link between the security camera and a mobile device of a user, and after the wireless communication link is established between the security camera and the mobile device of the user, the AEF may perform a backup of a set of user defined configuration settings for the security camera, as referenced by block 220. The AEF may reset the security camera back to a set of default configuration settings, as referenced by block 225, and reboot the security camera, as referenced by block 230. The AEF may then restore the set of user defined configuration settings, as referenced by block 235.

In some cases, the AEF may upload updated firmware from the mobile device and install the updated firmware before rebooting the security camera, as referenced by block 240. In some cases, the AEF may perform or initiate a diagnostic test on the security camera and record the results, as referenced by block 245, and may send the results of the diagnostic test performed or initiated by the AEF to the mobile device, as referenced by block 250. The AEF may receive one or more software patched from the mobile device and install the one or more software patches before rebooting the security camera, as referenced by block 255.

Figure 5:
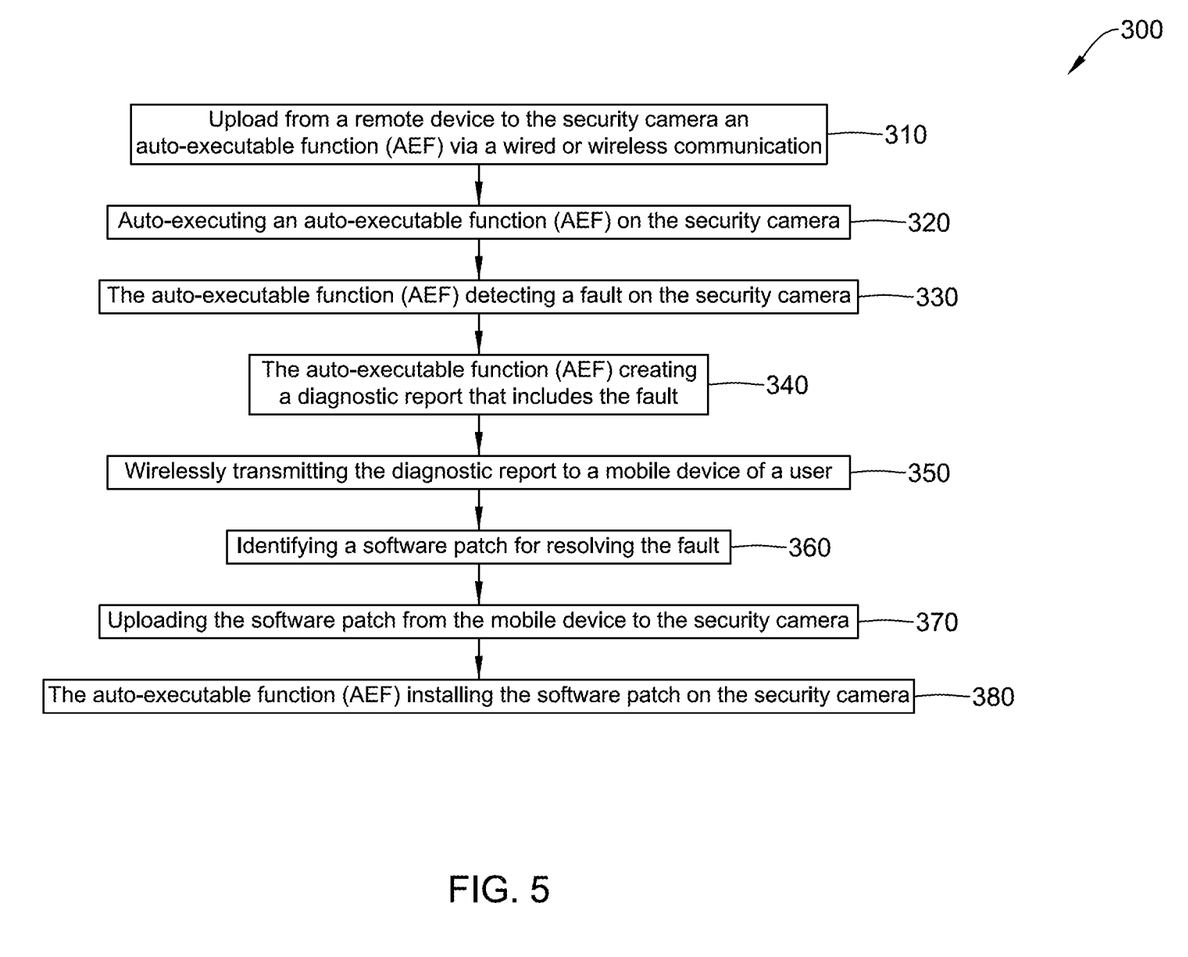
FIG. 5 is a flow diagram showing an illustrative method that may be carried out via the illustrative video surveillance system of FIG. 1.

FIG. 5 is a flow diagram showing an illustrative method 300 of resolving one or more faults in a security camera (e.g., security camera 20) that may be carried out via the illustrative video surveillance system 10 of FIG. 1. The illustrative method 300 includes uploading from a remote device to the security camera an auto-executable function (AEF) via a wired or wireless communication, as referenced by block 310. The remote device may be a mobile device such as a mobile phone, a tablet computer, a laptop computer, a personal computer, a server, or any other suitable remote device. In some cases, the wired or wireless communication link may include, for example, an ethernet link, a LiFi link, a WiFi link, a Bluetooth link, a 5G link, a SIM card link, and/or any other suitable communication link. In some cases, the AEF may be pre-loaded into the security camera by the manufacturer of the security camera, such as pre-loaded in the firmware of the security camera. The method 300 may include auto-executing an auto-executable function (AEF) on the security camera, as referenced by block 320. The AEF may detect a fault in the security camera, as referenced by block 330, and in response may create a diagnostic report that includes the fault, as referenced by block 340. In some cases, the diagnostic report may include, for example, one or more of a current status of each of one or more components of the security camera, a measure of a response time for each of one or more components of the security camera, a measure of a utilization rate for each of one or more components of the security camera, a set of current configuration settings for the security camera, a software version for each of one or more software components currently running on the security camera, and a hardware identifier for each of one or more components of the security camera. In some cases, the one or more components of the security camera may include hardware components such as a camera, a lens, a housing, mounts, and/or wiring. The diagnostic report may be wirelessly transmitted to a mobile device of a user, as referenced by block 350. An application on the mobile device may identify a software patch for resolving the fault (sometimes by interacting with a remote diagnostic server such as remote server 16), as referenced by block 360, and may upload the software patch from the mobile device to the security camera, as referenced by block 370. The AEF may then install the software patch on the security camera, as referenced by block 380.

Figure 6:
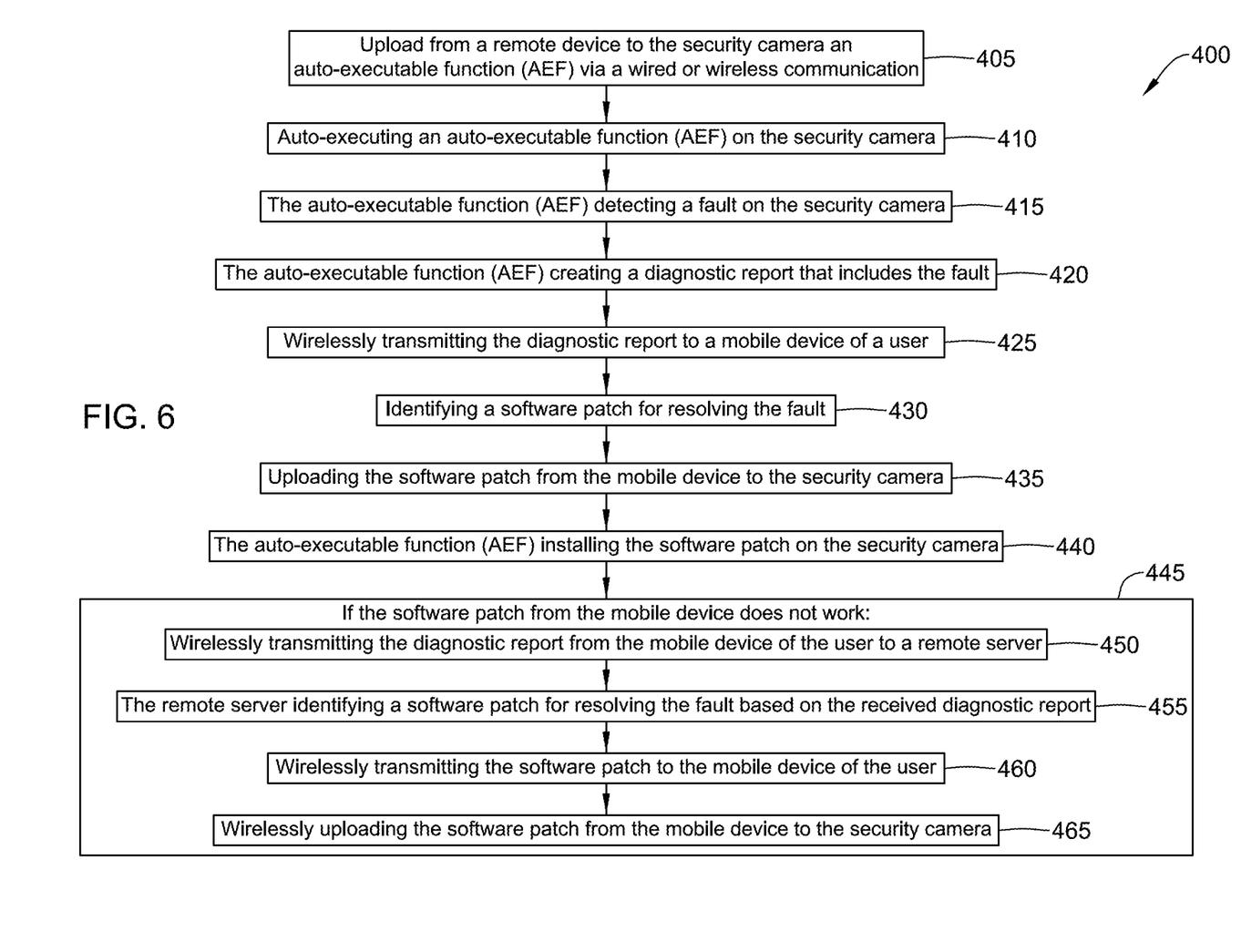
FIG. 6 is a flow diagram showing an illustrative method that may be carried out via the illustrative video surveillance system of FIG. 1.

FIG. 6 is a flow diagram showing an illustrative method 400 of resolving one or more faults in a security camera (e.g., security camera 20) that may be carried out via the illustrative video surveillance system 10 of FIG. 1. The illustrative method 400 includes uploading from a remote device to the security camera an auto-executable function (AEF) via a wired or wireless communication, as referenced by block 405. The remote device may be a mobile device such as a mobile phone, a tablet computer, a laptop computer, a personal computer, a server, or any other suitable remote device. In some cases, the wired or wireless communication link may include, for example, an ethernet link, a LiFi link, a WiFi link, a Bluetooth link, a 5G link, a SIM card link, and/or any other suitable communication link. In some cases, the AEF may be pre-loaded into the security camera by the manufacturer of the security camera, such as pre-loaded in the firmware of the security camera. The method 400 may include auto-executing an auto-executable function (AEF) on the security camera, as referenced by block 410. The AEF may detect a fault in the security camera, as referenced by block 415, and in response may create a diagnostic report that includes the fault, as referenced by block 420. The diagnostic report may be wirelessly transmitted to a mobile device of a user, as referenced by block 425. An application on the mobile device may identify a software patch for resolving the fault (sometimes by interacting with a remote diagnostic server such as remote server 16), as referenced by block 430, and may upload the software patch from the mobile device to the security camera, as referenced by block 435. The AEF may then install the software patch on the security camera, as referenced by block 440.

As referenced by block 445, if the software patch from the mobile device does not work or a software patch is not available, the diagnostic report may be wirelessly transmitted from the mobile device of the user to a remote server, as referenced by block 450. The remote server may identify a software patch for resolving the particular fault based on the received diagnostic report, as referenced by block 455, and may wirelessly transmit the software patch to the mobile device of the user, as referenced by block 460. The application on the mobile device may wirelessly upload the software patch from the mobile device to the security camera, as referenced by block 465. In some cases, when the remote server cannot identify a suitable software patch for resolving the particular fault based on the received diagnostic report, the remote server may request assistance from a software patch development teach in identifying/creating a suitable software patch. For example, the remote server may request that a software patch be created by a software engineer based upon the diagnostic report. Once the software patch is identified (e.g., created), the remote server may transmit the software patch to the mobile device of the user, and the mobile device may wirelessly upload the software patch to the security camera.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A security camera comprising:
a non-volatile memory, the non-volatile memory storing:
a firmware for the security camera;
a set of default configuration settings for the security camera;
a set of user defined configuration settings for the security camera;
an auto-executable function (AEF);
a controller operatively coupled to the non-volatile memory, the controller configured to:
auto-execute the auto-executable function (AEF), the auto-executable function (AEF) causing the controller to:
backup the set of user defined configuration settings to the non-volatile memory;
reset the security camera back to the set of default configuration settings;
reboot the security camera; and
restore the set of user defined configuration settings;
wherein the controller is configured to auto-execute the auto-executable function (AEF) in response to one or more of:
a reboot of the security camera;
a detected fault in the security camera; and
an establishment of a communication link between the security camera and a mobile device.

2. The security camera of claim 1, wherein the auto-executable function (AEF) is configured to cause the controller to update the firmware stored in the non-volatile memory before rebooting the security camera.

3. The security camera of claim 1, wherein the auto-executable function (AEF) is uploaded via a mobile device through one of: ethernet, Li-Fi, Wi-Fi, Bluetooth, 5G, or a SIM card, wherein the mobile device is one of: a mobile application, a PC, or a laptop.

4. The security camera of claim 1, further comprising a communication module that is configured to establish a communication link with a mobile device of a user, wherein the communication module is configured to receive the auto-executable function (AEF) from the mobile device and store the auto-executable function (AEF) in the non-volatile memory of the security camera for auto-execution by the controller of the security camera.

5. The security camera of claim 1, further comprising a communication module that is configured to establish a communication link with a mobile device of a user even when the controller of the security camera is non-responsive.

6. The security camera of claim 1, wherein the auto-executable function (AEF) is configured to cause the controller to perform diagnostic tests on the security camera and record the results.

7. The security camera of claim 6, further comprising a communication module that is configured to establish a communication link with a mobile device of a user, wherein the communication module is configured to send the results of the diagnostic tests performed by the auto-executable function (AEF) to the mobile device.

8. The security camera of claim 7, wherein the communication module is configured to receive one or more software patches from the mobile device.

9. A method of resolving one or more faults in a security camera, the method comprising:
executing an auto-executable function (AEF) on the security camera;
the auto-executable function (AEF) detecting a fault in the security camera;
the auto-executable function (AEF) creating a diagnostic report that includes the fault;
wirelessly transmitting the diagnostic report to a mobile device of a user;
identifying a software patch for resolving the fault;
uploading the software patch from the mobile device to the security camera; and
the auto-executable function (AEF) installing the software patch on the security camera.

10. The method of claim 9, wherein the diagnostic report includes one or more of:
a current status of each of one or more components of the security camera;
a measure of a response time for each of one or more components of the security camera;
a measure of a utilization rate for each of one or more components of the security camera;
a set of current configuration settings for the security camera;
a software version for each of one or more software components currently running on the security camera; and
a hardware identifier for each of one or more components of the security camera.

11. The method of claim 9 comprising:
wirelessly transmitting the diagnostic report from the mobile device of the user to a remote server;
the remote server identifying the software patch for resolving the fault based on the received diagnostic report;
wireless transmitting the software patch to the mobile device of the user; and
wirelessly uploading the software patch from the mobile device to the security camera.

12. The method of claim 11, wherein when the remote server cannot identify the software patch for resolving the fault based on the received diagnostic report, the remote server requesting assistance in identifying the software patch, and once the software patch is identified, the remote server wirelessly transmitting the software patch to the mobile device of the user, and the mobile device wirelessly uploading the software patch to the security camera.

13. The method of claim 9, wherein the software patch is uploaded from the mobile device to the security camera using one of Li-Fi and Bluetooth.

14. A method of resolving one or more faults in a security camera, the method comprising:
auto-executing an auto-executable function (AEF) on the security camera;
the auto-executable function (AEF) detecting a fault on the security camera;
the auto-executable function (AEF) performing a backup of a set of user defined configuration settings for the security camera;
the auto-executable function (AEF) resetting the security camera back to a set of default configuration settings the auto-executable function (AEF) rebooting the security camera; and
the auto-executable function (AEF) restoring the set of user defined configuration settings.

15. The method of claim 14, wherein the auto-executable function (AEF) is used to establish a wireless communication link between the security camera and a mobile device of a user, and after the wireless communication link is established between the security camera and the mobile device of the user:
- the auto-executable function (AEF) performing a backup of a set of user defined configuration settings for the security camera;
- the auto-executable function (AEF) resetting the security camera back to a set of default configuration settings;
- the auto-executable function (AEF) rebooting the security camera; and
- the auto-executable function (AEF) restoring the set of user defined configuration settings.

16. The method of claim 15, wherein the auto-executable function (AEF) further uploading updated firmware from the mobile device and installing the updated firmware before rebooting the security camera.

17. The method of claim 15, wherein the auto-executable function (AEF) further performing a diagnostic test on the security camera and recording the results.

18. The method of claim 17, wherein the auto-executable function (AEF) further:
- sending the results of the diagnostic test performed by the auto-executable function (AEF) to the mobile device; and
- receiving one or more software patches from the mobile device, and installing the one or more software patches before rebooting the security camera.

19. The method of claim 15, wherein the auto-executable function (AEF) is auto-executed on the security camera in response to one or more of:
- a reboot of the security camera;
- a detected fault in the security camera; and
- establishing a communication link between the security camera and the mobile device.

* * * * *